US011358603B2

(12) United States Patent
Lerner et al.

(10) Patent No.: US 11,358,603 B2
(45) Date of Patent: Jun. 14, 2022

(54) AUTOMATED VEHICLE PROFILE DIFFERENTIATION AND LEARNING

(71) Applicant: FORD GLOBAL TECHNOLOGIES, LLC, Dearborn, MI (US)

(72) Inventors: Jeremy Lerner, Southfield, MI (US); James Issac, Ypsilanti, MI (US); Jae Hyung Lim, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 430 days.

(21) Appl. No.: 16/441,613

(22) Filed: Jun. 14, 2019

(65) Prior Publication Data

US 2020/0391755 A1 Dec. 17, 2020

(51) Int. Cl.
*B60W 50/00* (2006.01)
*G06F 16/2457* (2019.01)
*G06N 20/00* (2019.01)

(52) U.S. Cl.
CPC ... *B60W 50/0098* (2013.01); *G06F 16/24578* (2019.01); *G06N 20/00* (2019.01); *B60W 2050/0029* (2013.01); *B60W 2050/0075* (2013.01); *B60W 2050/0083* (2013.01); *B60W 2556/45* (2020.02)

(58) Field of Classification Search
CPC ......... B60W 50/0098; B60W 2556/45; B60W 2050/0029; B60W 2050/0075; B60W 2050/0083; G06N 20/00; G06F 16/24578

USPC ....................................................... 701/32.1
See application file for complete search history.

(56) References Cited

U.S. PATENT DOCUMENTS

| 7,864,029 | B2 | 1/2011 | Huang et al. |
| 9,193,359 | B2 | 11/2015 | Hui et al. |
| 2012/0323690 | A1* | 12/2012 | Michael ............. G01C 21/3461 705/14.58 |
| 2016/0101783 | A1 | 4/2016 | Abou-Nasr et al. |
| 2016/0368509 | A1 | 12/2016 | Uppal |

FOREIGN PATENT DOCUMENTS

DE 102015207774 A1 11/2016

* cited by examiner

*Primary Examiner* — Gertrude Arthur Jeanglaude
(74) *Attorney, Agent, or Firm* — Michael J. Spenner; Brooks Kushman P.C.

(57) ABSTRACT

A system for a vehicle includes a memory configured to store modeling parameters, generated using an algorithm that assigns relevance scores to features, that specify information indicative of how configuration data including information indicative of use of features of the vehicle classifies which user is currently using the vehicle. The system also includes a processor programmed to monitor the vehicle for the configuration data, identify a most likely user profile using the modeling parameters according to the configuration data, and apply settings of the user profile to the vehicle.

18 Claims, 2 Drawing Sheets

AUTOMATED VEHICLE PROFILE DIFFERENTIATION AND LEARNING

TECHNICAL FIELD

The present disclosure relates to aspects of differentiation between multiple users of a vehicle, as well as the learning of profiles for those multiple users.

BACKGROUND

A primary user of a vehicle may set up a profile for some vehicle features. Most secondary users, however, may forget to switch profiles or may ignore the profile setup altogether. If a vehicle has several frequent users who have very different feature preferences, the vehicle may incorrectly learn the several users together as a single user profile.

SUMMARY

In one or more illustrative examples, a system for a vehicle includes a memory configured to store modeling parameters, generated using an algorithm that assigns relevance scores to features, that specify information indicative of how configuration data including information indicative of use of features of the vehicle classifies which user is currently using the vehicle. The system also includes a processor programmed to monitor the vehicle for the configuration data, identify a most likely user profile using the modeling parameters according to the configuration data, and apply settings of the user profile to the vehicle.

In one or more illustrative examples, a method includes receiving training configuration data, the training configuration data including information indicative of use of features of a vehicle over time augmented with information indicative of which user is currently using the vehicle; identifying, using an algorithm that assigns relevance scores to the features, modeling parameters that specify information indicative of how the training configuration data classifies which user is currently using the vehicle; and sending the modeling parameters to the vehicle for use in identifying which user is currently using the vehicle.

In one or more illustrative examples, a non-transitory computer-readable medium comprising instructions that, when executed by a processor, cause the processor to receive training configuration data, the training configuration data including information indicative of use of features of a vehicle over time augmented with information indicative of which user is currently using the vehicle; identify, using an algorithm that assigns relevance scores to the features, modeling parameters that specify information indicative of how the training configuration data classifies which user is currently using the vehicle; and send the modeling parameters to the vehicle for use in identifying which user is currently using the vehicle.

DETAILED DESCRIPTION

Figure 1:
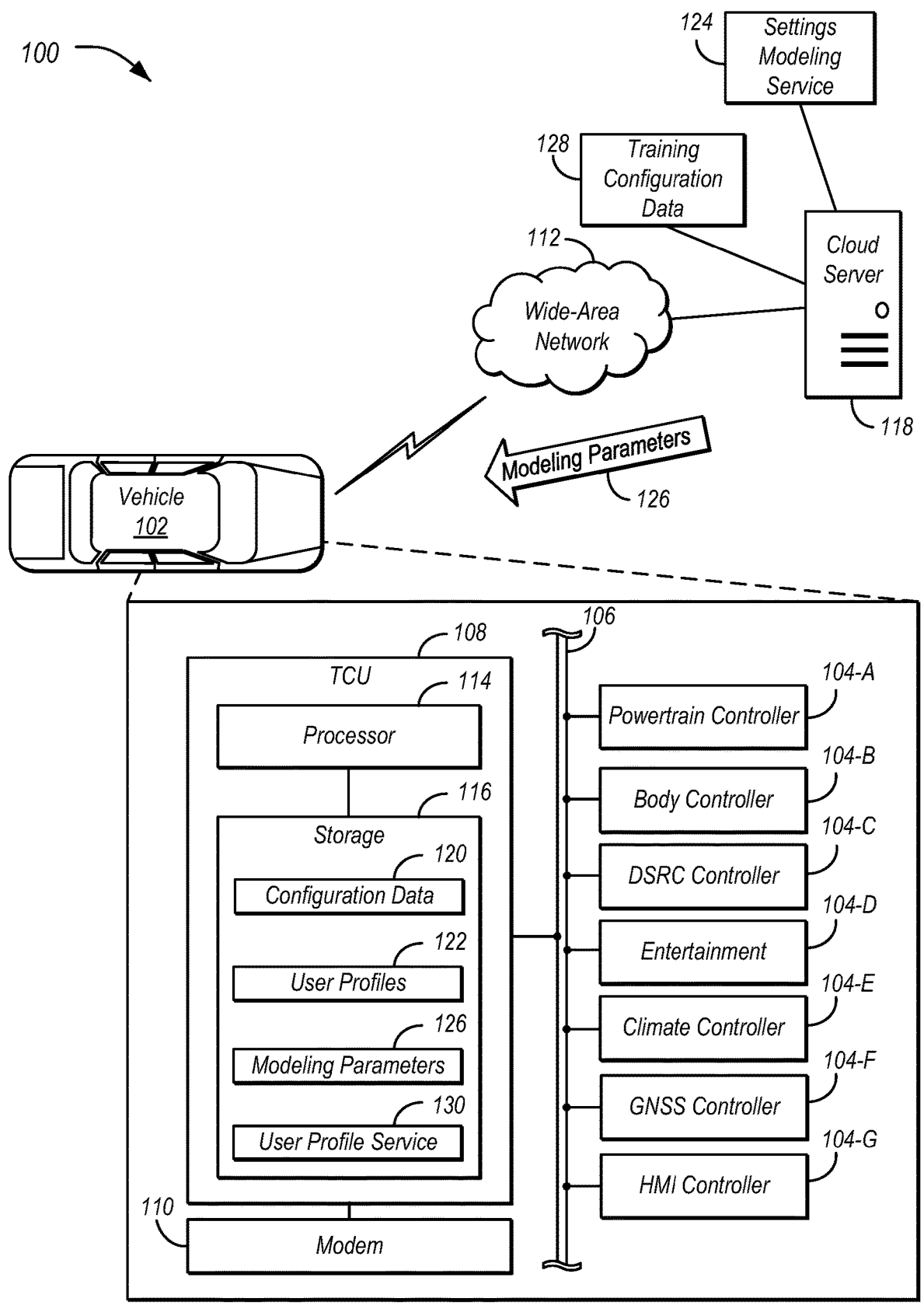
FIG. 1 illustrates an example system using gradient boosting techniques for automatically differentiating between and learning user profiles for multiple users of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It may be desirable for a vehicle to establish different profiles for user specific features, such as radio recommendations. Additionally, it may be desirable to classify mixed use of a cloud enhanced feature, where perhaps one user engages the feature, and another does not. Such data may only be seen at the vehicle level, which may make it difficult to intelligently use the information that is available. The data may be very eclectic and even create a false single user profile for one vehicle that is effectively the combination of two distinct users.

Existing vehicle signals may be used as data points to establish the different users. These data points may include vehicle configuration information as well as trip-based information. As some non-limiting examples, vehicle configuration data may include: data from the driver's seat weight sensor (e.g., if two users have different enough weights); steering wheel position; seat position; side mirror positions; rearview mirror position (if collected); which phone is connected to the vehicle (notably this may not be a sufficient condition, as sometimes the primary user can be a passenger in the vehicle with a secondary user so multiple phones and keys are in the vehicle); the passenger's seat weight sensor; initial air conditioning/heater profile; seat warmer/cooler profile; which and how many doors opened and closed before the trip begins; is the trunk opened before the trip starts; radio station tuned to; if the radio station is immediately changed before driving commences; which key is used to start the vehicle (this may not be a sufficient condition, as sometimes the primary user can be a passenger in the vehicle); side window positions; idle time before the actual trip commences; and parking brake active or not; or whether each particular feature changed from the last trip. As some other non-limiting examples, trip-based information may include trip starting location; trip destination location (if programmed in before driving commences); and average starting drive time of day. In an example, a set of these or other data points may be used to set an initial classification of which profile is appropriate (or if a new one should be created). In another example, fuel level increases may be monitored (e.g., if only one driver fuels up the vehicle, that information may indicate which driver is present).

Additional features may be used to refine the classification as the trip progresses. For example, the initial classification may be refined using one or more of: braking and acceleration profiles; trip length; waypoint history as compared to previous users' histories of locations; average cabin temperature; application usage; or trip end location.

A gradient boosting machine may be trained built on decision trees in some sample cases with some of these features when there are and are not several distinct users to determine the importance of each feature for determining distinct users. The gradient boosting machine may be an appropriate algorithm choice as it returns relevance factors for all input features. It should be noted that while many examples herein utilize a gradient boosting machine, in other examples other algorithms may be used to assign relevance scores to various features, such as random forests. Further aspects of the disclosure are described in detail below.

FIG. 1 illustrates an example system 100 using gradient boosting techniques for automatically differentiating between multiple users of a vehicle 102, as well as the learning of user profiles 122 for those multiple users. As illustrated, the vehicle includes a plurality of vehicle controllers 104 in communication over one or more vehicle buses 106. The system 100 also includes a cloud server 118 configured to maintain configuration data 120 indicative of settings elections made to the vehicle controllers 104 by a user of the vehicle 102. In a learning phase, the cloud server 118 may utilize a settings modeling service 124 to identify modeling parameters 126 from the configuration data 120 which may be useful in disambiguating users. The vehicle 102 includes a telematics control unit (TCU) 108 configured to receive the modeling parameters 126 from the cloud server 118. The TCU 108 may utilize a user profile update service 130 to use the modeling parameters 126 to learn discrete user profiles from the configuration data 120. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the controllers 104, as well as between the TCU 108 and the vehicle controllers 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle controllers 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, and a telephone network, as some non-limiting examples. As another example, the TCU 108 may utilize one or more of BLUETOOTH, Wi-Fi, or wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The cloud server 118 may include various types of computing apparatus, such as a computer workstation, a server, a desktop computer, a virtual server instance executed by a mainframe server, or some other computing system and/or device. Similar to the TCU 108, the cloud server 118 generally includes a memory on which computer-executable instructions may be maintained, where the instructions may be executable by one or more processors (not shown for clarity). Such instructions and other data may be stored using a variety of computer-readable media. In a non-limiting example, the OTA cloud server 118 may be configured to maintain the configuration data 120 and the settings modeling service 124.

The vehicle configuration data 120 includes data with respect to settings or configurations of the controllers 104 of the vehicle 102. The vehicle configuration data 120 may include data with respect to feature utilization of the controllers 104, and/or with respect to sensor data captured by the controllers 104 of the vehicle 102. The vehicle configuration data 120 may be used to generate an activity map that includes indications of the usage of each of a plurality of features over time, such that when usage of various aspects of the vehicle are used or are not used may be tracked.

As some non-limiting examples, the vehicle configuration data 120 may include: data from the driver's seat weight sensor (e.g., if two users have different enough weights); steering wheel position; seat position; side mirror positions; rearview mirror position (if collected); which phone is connected to the vehicle 102 (notably this may not be a sufficient condition, as sometimes the primary user can be a passenger in the vehicle 102 with a secondary user so multiple phones and keys are in the vehicle); the passenger's seat weight sensor; initial air conditioning/heater profile; seat warmer/cooler profile; which and how many doors opened and closed before the trip begins; is the trunk opened before the trip starts; radio station tuned to; if the radio station is immediately changed before driving commences; which key is used to start the vehicle 102 (this may not be a sufficient condition, as sometimes the primary user can be a passenger in the vehicle 102); side window positions; idle time before the actual trip commences; and parking brake active or not; or whether each particular feature changed from the last trip. As some other non-limiting examples, trip-based information may include trip starting location; trip destination location (if programmed in before driving commences); and average starting drive time of day. Additional features may be used to refine the classification as the trip progresses. For example, the initial classification may be refined using one or more of: braking and acceleration profiles; trip length; waypoint history as compared to previous users' histories of locations; average cabin temperature; application usage; or trip end location. In another example, fuel level increases may be monitored (e.g., if only one driver fuels up the vehicle 102, that information may indicate which driver is present).

The user profiles 122 include settings data that corresponds to preferences for various users. For example, one of the user profiles 122 corresponding to a specific user may include seat settings, mirror settings, radio settings, climate control settings, suspension settings, brake regen settings, and/or autonomous driving feature settings, as some possibilities. The user profiles 122 may additionally include account information that corresponds to the user, such as user names, account numbers, payment information for transactions, and/or access rights to vehicles 102 or to vehicle 102 features. Due to the data included in the user profile 122, it may be desirable for the vehicle 102 to automatically identify the user of the vehicle 102, so as to apply the correct user profile 122 for the current vehicle occupant, as well as to ensure that further learning of user settings are applied back to the correct user profile 122.

The settings modeling service 124 may be one application included on the storage of the cloud server 118. The settings modeling service 124 may include instructions that, when executed by one or more processors of the cloud server 118, cause the cloud server 118 to analyze vehicle training configuration data 128 to determine modeling parameters 126 that include information indicative of how the vehicle configuration data 120 may be used to classify which user is currently using a vehicle 102. In an example, the settings modeling service 124 may be programmed to utilize a gradient boosting machine trained using training configuration data 128. An example implementation of a gradient boosting machine is the open-source XGBoost library, although the use of other gradient boosting machine implementations is contemplated. It should be noted that while many examples herein utilize a gradient boosting machine, in other examples other algorithms may be used to assign relevance scores to various features, such as random forests.

The training configuration data 128 may include a set of configuration data 120 augmented with information indicative of which user is currently utilizing the vehicle 102. By having this ground truth data, the gradient boosting machine may build decision trees of the features logged in the training configuration data 128 to determine the importance of each feature for determining distinct users. The gradient boosting machine may be an appropriate algorithm choice as it returns relevance factors for all input features. A classifier based on many of these input feature factors (or small subsets thereof) may be referred to as weak learners. A weak learner is a classifier that does slightly better than chance (i.e., has an error rate less than 0.5) regardless of the training data. The gradient boosting machine may combine multiple weak learners based on features that have low correlation to the current user into a single strong learner in an iterative fashion. The modeling parameters 126 may specify these features and how they may be combined to provide a strong learner of the user of the vehicle 102. The settings modeling service 124 may be programmed to send the modeling parameters 126 to the vehicle 102.

The user profile update service 130 may be one application included on the storage 116 of the TCU 108. When executed by the processor 114, the user profile update service 130 may be programmed to utilize configuration data 120 retrieved from the controllers 104, via the vehicle buses 106 or otherwise, to determine the current user of the vehicle 102. The user profile update service 130 may utilize the modeling parameters 126 received from the cloud server 118 to distinguish between users of the vehicle 102, to identify which user profile 122 according to the recent configuration data 120 available at the vehicle 102 to use.

Figure 2:
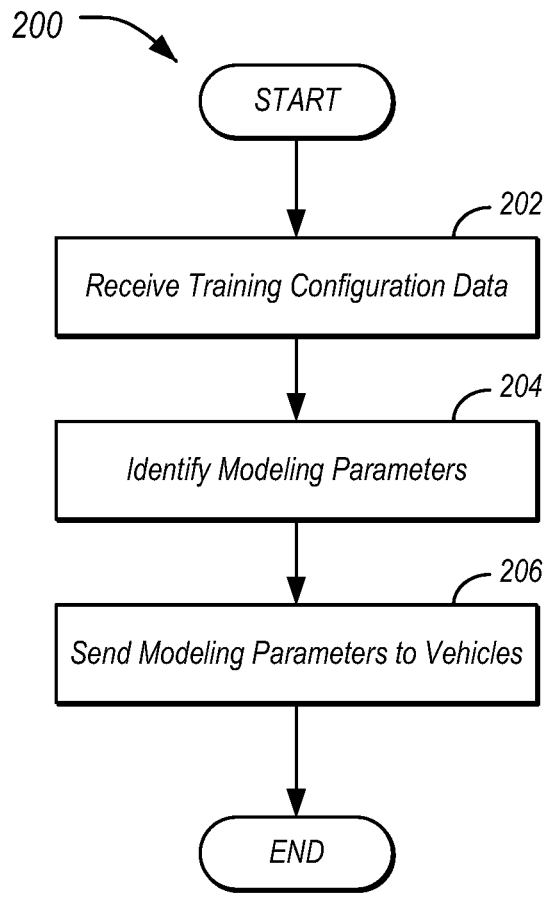
FIG. 2 illustrates an example process for creating modeling parameters based on training configuration data using a settings modeling service.

FIG. 2 illustrates an example process 200 for creating modeling parameters 126 based on training configuration data 128 using a settings modeling service 124. In an example, the process 200 may be performed by the cloud server 118 in the context of the system 100.

At operation 202, the settings modeling service 124 receives training configuration data 128. In an example, the settings modeling service 124 receives the training configuration data 128 from a storage of the cloud server 118. Additionally or alternately, the settings modeling service 124 receives the training configuration data 128 from one or more vehicles 102.

The settings modeling service 124 identifies modeling parameters 126 at 204. In an example, the settings modeling service 124 utilizes the gradient boosting machine to identify learners in the training configuration data 128 and combines multiple features that are weaker learners with lower correlation to the current user into a single strong learner in an iterative fashion. The modeling parameters 126 may specify these features and how they may be combined to provide the strong learner of the user of the vehicle 102.

At 206, the settings modeling service 124 sends the modeling parameters 126 to vehicles 102. In one example, the settings modeling service 124 sends updated modeling parameters 126 to vehicles 102 responsive to receiving updated training configuration data 128 from the vehicles 102 at operation 202. In another example, the settings modeling service 124 send the modeling parameters 126 to the vehicle 102 responsive to a request for updated modeling parameters 126 received from the vehicle 102. In yet a further example, the settings modeling service 124 sends the updated modeling parameters 126 to the vehicle 102 periodically, such as once a month. After operation 206, the process 200 ends.

Figure 3:
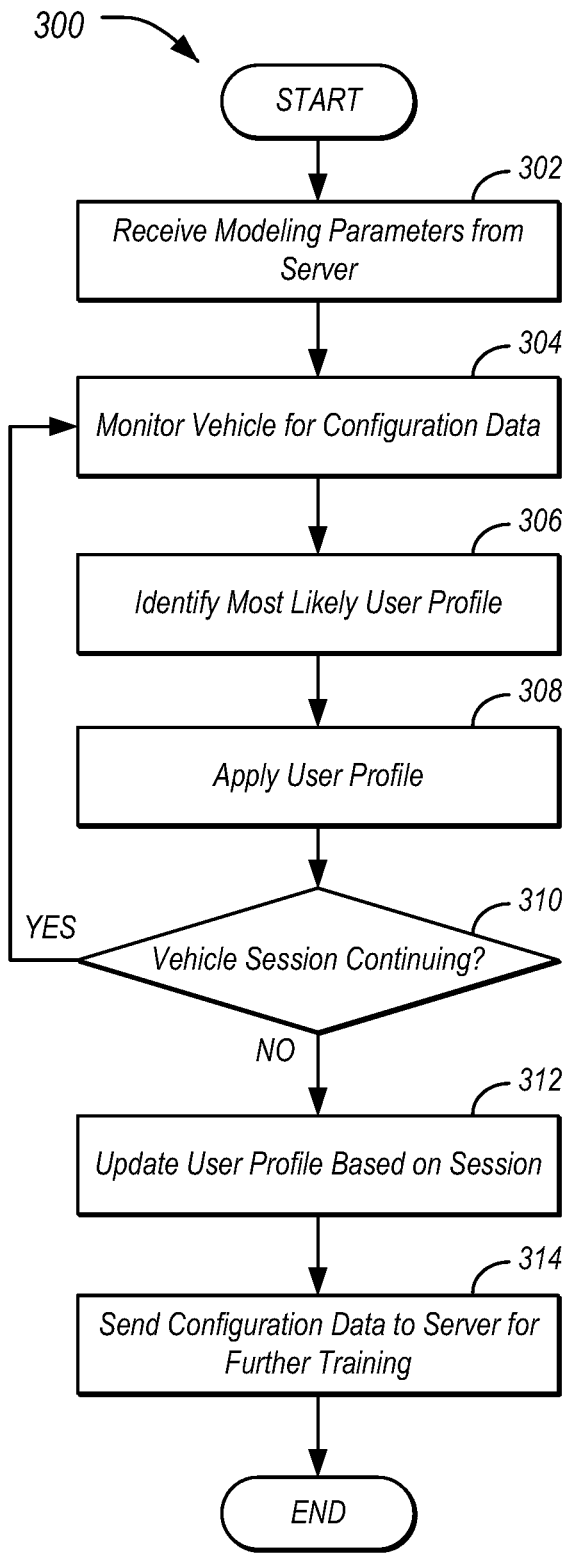
FIG. 3 illustrates an example process for utilizing modeling parameters for identifying a user profile according to configuration data for a vehicle.

FIG. 3 illustrates an example process 300 for utilizing modeling parameters 126 for identifying a user profile 122 according to configuration data 120 for a vehicle 102. In an example, the process 300 may be performed by the vehicle 102 in the context of the system 100.

At operation 302, the vehicle 102 receives modeling parameters 126 from the cloud server 118. In an example, the vehicle 102 may receive the modeling parameters 126 in one or more of the ways discussed above with respect to operation 206 of the process 200.

The vehicle 102 monitors itself for configuration data 120 at 304. In an example, the user profile update service 130 directs the TCU 108 of the vehicle 102 to monitor the vehicle bus 106 for data with respect to settings or configurations of the controllers 104 of the vehicle 102. The vehicle configuration data 120 may include data with respect to feature utilization of the controllers 104, and/or with respect to sensor data captured by the controllers 104 of the vehicle 102. The user profile service 130 may compile the vehicle configuration data 120 into an activity map that indicates the usage of each of a plurality of features over time, such that when usage of various aspects of the vehicle 102 are used or are not used may be tracked.

At operation 306, the vehicle 102 identifies a most-likely user profile 122. In an example, the vehicle 102 utilizes the modeling parameters 126 to analyze the activity map created from the vehicle configuration data 120 to classify which of the user profiles 122 is most similar to the configuration data 120. While only one or a few features alone may not be sufficient to adequately identify a user, the modeling parameters 126 determined using the gradient boost machine may allow for those features to be combined to provide a strong indication of which user profile 122 should apply.

At 308, the vehicle 102 applies the user profile 122 to the vehicle 102. In an example, the user profile service 130 directs the TCU 108 of the vehicle 102 to supply settings to the controllers 104 consistent with the user of the vehicle 102. In another example, the user profile service 130 directs the TCU 108 of the vehicle 102 to supply an indication of the user to the controller 104 to allow the controllers to adjust their settings in accordance with the current user. Accordingly, the vehicle 102 may automatically select settings consistent with the current user, without requiring the user to explicitly change profiles, and without pure reliance on information such as which key fob is being used or which phone(s) are present in the vehicle 102.

The vehicle 102 determines whether a use session of the vehicle 102 is continuing at 310. In an example, if the vehicle 102 is continuing to be driven or if the vehicle 102 continues to be in a motive move in which the vehicle 102 may move, then control returns to operation 304 to continue to monitor the vehicle 102 for configuration data 120. This may be useful because additional features may be used to refine the classification as the trip progresses. For example, the initial classification may be refined using one or more of: braking and acceleration profiles; trip length; waypoint history as compared to previous users' histories of locations; average cabin temperature; application usage; trip end location; or fuel level increases. If, however, the vehicle 102 is parked or vacated, or has reached a navigation destination, then the vehicle 102 may determine that the session has concluded and transition to operation 312.

The vehicle 102 updates the user profile 122 based on the use session at 312. For instance, settings that may have been changed during the use session may be applied back to the current user profile 122. This may allow for the user profile 122 to be dynamic and to evolve to better suit the user as additional usage of the vehicle 102 is logged.

At 314, the vehicle 102 sends the configuration data 120 to the cloud server 118. This data may be used, in an example, as further training configuration data 128, which may aid in improving the modeling parameters 126, such as described above with respect to the process 200. After operation 314, the process 300 ends.

Variations on the example system 100 and processes 200, 300 may be made as well. In another example, the user profiles 122 may be roaming profiles that are saved to the cloud server 118, and that may be downloaded by the vehicle 102 from the cloud server 118 responsive to identification of the user.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for a vehicle, comprising:
    a memory configured to store modeling parameters, generated using an algorithm that assigns relevance scores to features, that specify information indicative of how configuration data including information indicative of use of features of the vehicle classifies which user is currently using the vehicle, wherein the modeling parameters indicate how to combine weak learners, the weak learners being classifiers based on subsets of the features from the configuration data that have low correlation to identifying which user is currently using the vehicle, into a single strong learner in an iterative fashion; and
    a processor programmed to
        monitor the vehicle for the configuration data,
        identify a most-likely user profile using the modeling parameters according to the configuration data, and
        apply settings of the user profile to the vehicle.

2. The system of claim 1, wherein the algorithm that assigns the relevance scores to the features is a gradient boosting machine.

3. The system of claim 1, wherein the processor is further programmed to receive the modeling parameters from a cloud server over a wide-area network.

4. The system of claim 3, wherein the processor is further programmed to send the configuration data to the cloud server over the wide-area network.

5. The system of claim 1, wherein the processor is further programmed to:
    continue to monitor the vehicle for additional configuration data, and
    refine an indication of the most-likely user profile using the modeling parameters according to the additional configuration data.

6. The system of claim 1, wherein the processor is further programmed to update the settings of the user profile according to setting changes made during application of the user profile to the vehicle.

7. The system of claim 1, wherein the processor is further programmed to:
    generate, from the configuration data, an activity map that includes indications of usage over time of each of a plurality of features specified by the configuration data, and
    utilize the activity map and the modeling parameters to identify the most-likely user profile.

8. The system of claim 1, wherein the processor is further programmed to monitor the vehicle for the configuration data over a plurality of vehicle buses.

9. A method comprising:
    receiving training configuration data, the training configuration data including information indicative of use of features of a vehicle over time augmented with information indicative of which user is currently using the vehicle;
    identifying, using an algorithm that assigns relevance scores to the features, modeling parameters that specify information indicative of how the training configuration data classifies which user is currently using the vehicle; and
    sending the modeling parameters to the vehicle for use in identifying which user is currently using the vehicle,
    wherein the modeling parameters indicate how to combine weak learners, the weak learners being classifiers based on subsets of the features from the training configuration data that have low correlation to identifying which user is currently using the vehicle, into a single strong learner in an iterative fashion.

10. The method of claim 9, wherein the algorithm that assigns the relevance scores to the features is a gradient boosting machine.

11. The method of claim 9, further comprising receiving vehicle configuration data from the vehicle to augment the training configuration data.

12. The method of claim 11, further comprising:
    identifying the modeling parameters responsive to receipt of the vehicle configuration data from the vehicle, and
    sending the modeling parameters to the vehicle responsive to completion of the identifying of the modeling parameters.

13. The method of claim 9, wherein the training configuration data includes one or more of (i) data with respect to feature utilization of controllers of the vehicle, or (ii) sensor data captured by controllers of the vehicle.

14. A non-transitory computer-readable medium comprising instructions that, when executed by a processor, cause the processor to:
    receive training configuration data, the training configuration data including information indicative of use of features of a vehicle over time augmented with information indicative of which user is currently using the vehicle;
    identify, using an algorithm that assigns relevance scores to the features, modeling parameters that specify information indicative of how the training configuration data classifies which user is currently using the vehicle; and
    send the modeling parameters to the vehicle for use in identifying which user is currently using the vehicle,
    wherein the modeling parameters indicate how to combine weak learners, the weak learners being classifiers based on subsets of the features from the training configuration data that have low correlation to identifying which user is currently using the vehicle, into a single strong learner in an iterative fashion.

15. The medium of claim 14, wherein the algorithm that assigns the relevance scores to the features is a gradient boosting machine.

16. The medium of claim 14, further comprising instructions that, when executed by the processor, cause the processor to receive vehicle configuration data from the vehicle to augment the training configuration data.

17. The medium of claim 16, further comprising instructions that, when executed by the processor, cause the processor to:
  identify the modeling parameters responsive to receipt of the vehicle configuration data from the vehicle, and
  send the modeling parameters to the vehicle responsive to completion of the identifying of the modeling parameters.

18. The medium of claim 14, wherein the training configuration data includes one or more of: (i) data with respect to feature utilization of controllers of the vehicle, or (ii) sensor data captured by controllers of the vehicle.

* * * * *